US012764483B2

(12) United States Patent
Ryzner et al.

(10) Patent No.: US 12,764,483 B2
(45) **Date of Patent: *Oct. 13, 2026**

(54) ACOUSTICAL OR VIBRATIONAL MONITORING IN A GUIDED ASSEMBLY SYSTEM

(71) Applicant: LightGuide, Inc., Wixom, MI (US)

(72) Inventors: Paul Ryznar, Northville, MI (US); William T. Sommerville, Wixom, MI (US); Ryan J. Feldman, Farmington Hills, MI (US)

(73) Assignee: LightGuide, Inc., Wixom, MI (US)

( * ) Notice: Subject to any disclaimer, the term of this patent is extended or adjusted under 35 U.S.C. 154(b) by 176 days.

This patent is subject to a terminal disclaimer.

(21) Appl. No.: 18/903,401

(22) Filed: Oct. 1, 2024

(65) Prior Publication Data

US 2025/0024215 A1 Jan. 16, 2025

Related U.S. Application Data

(63) Continuation of application No. 17/432,778, filed as application No. PCT/IB2020/051487 on Feb. 21, 2020, now Pat. No. 12,108,222.

(Continued)

(51) Int. Cl.

*H04R 29/00* (2006.01)
*G05B 19/418* (2006.01)

(52) U.S. Cl.

CPC ..... *H04R 29/004* (2013.01); *G05B 19/41805* (2013.01); *G05B 2219/31027* (2013.01); *G05B 2219/31046* (2013.01); *H04R 29/006* (2013.01)

(58) Field of Classification Search

CPC ...... G01H 3/06; H04R 29/004; H04R 29/006; Y02P 90/02; G05B 19/41805;

(Continued)

(56) References Cited

U.S. PATENT DOCUMENTS 7,515,981 B2 4/2009 Ryznar et al.
9,658,614 B2 5/2017 Ryznar et al.

(Continued)

FOREIGN PATENT DOCUMENTS

EP 2286963 A1 2/2011
WO 2017155968 A1 9/2017

OTHER PUBLICATIONS

International Search Report and Written Opinion of the International Searching Authority from corresponding Patent Cooperation Treaty (PCT) Application No. PCT/IB2020/051487, indicated completed on Jun. 1, 2020.

*Primary Examiner* — Paul Kim

(74) *Attorney, Agent, or Firm* — Gardner, Linn, Burkhart & Ondersma LLP

(57) ABSTRACT

A guidance, monitoring, and inspection system for a work area includes a non-visual sensory detection sensor, such as a microphone or vibration detection sensor, visual sensors, other sensors, and a processor. The microphone or vibration sensor is configured to sense sounds or vibrations generated in the work area during the performance of an action that are then received by a processor. The visual sensor and other sensors sense characteristics and identity of objects present in the work area. The processor analyzes the received acoustic and/or vibrational signals and compares the received signals to an expected signal associated with an operational step that was performed to confirm that the operational step has been performed, and that it has been performed properly. The processor identifies a particular operational step as defined by the visual sensors and the other sensors.

20 Claims, 5 Drawing Sheets

Related U.S. Application Data

(60) Provisional application No. 62/808,420, filed on Feb. 21, 2019.

(58) Field of Classification Search
CPC .... G05B 19/41875; G05B 2219/31027; G05B 2219/31046; G05B 2219/32181; G05B 2219/37433; G06Q 10/063114; G06Q 10/0639
USPC .......................................................... 700/95
See application file for complete search history.

(56) References Cited

U.S. PATENT DOCUMENTS

| | | | |
|---|---|---|---|
| 9,965,897 | B2 | 5/2018 | Ryznar et al. |
| 10,528,036 | B2 | 1/2020 | Ryznar et al. |
| 10,983,500 | B2 | 4/2021 | Ryznar et al. |
| 2003/0229500 | A1 | 12/2003 | Morris |
| 2013/0278635 | A1 | 10/2013 | Maggiore |
| 2015/0346383 | A1 | 12/2015 | Lopetrone |
| 2017/0102423 | A1* | 4/2017 | Maalouf .............. H01R 13/502 |
| 2018/0247662 | A1* | 8/2018 | Fan ..................... G10L 21/0232 |
| 2019/0073618 | A1* | 3/2019 | Kanukurthy ........... G08B 21/02 |

* cited by examiner

ACOUSTICAL OR VIBRATIONAL MONITORING IN A GUIDED ASSEMBLY SYSTEM

CROSS REFERENCE TO RELATED APPLICATIONS

The present application is a continuation of U.S. application Ser. No. 17/432,778, filed Aug. 20, 2021, which claims the benefit of International Patent application No. PCT/IB2020/051487, filed Feb. 21, 2020, and which claims the filing benefits of U.S. provisional application, Ser. No. 62/808,420, filed Feb. 21, 2019, which are all hereby incorporated by reference herein in their interties.

FIELD OF THE INVENTION

The present invention is directed to improvements in a system for guiding and/or monitoring an individual in the performance of operational steps, and in particular a system that provides monitoring and detection of non-visual sensory signals, such as auditory or vibrational monitoring of actions performed by an individual.

BACKGROUND OF THE INVENTION

U.S. Pat. No. 7,515,981 provides a LIGHT GUIDED ASSEMBLY SYSTEM for aiding human actions. Numerous activities involve the performance of pre-designated operational steps to properly complete a particular task, with some such activities needing to be completed within a specified or standard time allowance. Problems arise when such activities are improperly performed either from a workmanship standpoint and/or outside the standard time allowance, both of which add significant and undesirable cost and complexity to the manufacturing operations. In the case of failure to meet a standard time allowance, an entire assembly process may become unbalanced resulting in costly bottlenecks and excess inventory. Furthermore, there are also circumstances where a light guided assembly system will be unable to adequately provide light guidance for the performance of operational steps, nor be able to adequately monitor the performance of those operational steps.

In addition to manufacturing assembly operations, numerous other activities involve human performance of particular tasks that are desired to be performed, monitored, and inspected without omitting any steps.

SUMMARY OF THE INVENTION

Embodiments of the present invention provide methods and an apparatus to improve the performance of a light guided assembly system or other manufacturing and processing efforts. An acoustic and/or vibration detection system is adapted to provide monitoring of non-visual sensory signals, such as acoustic signals or vibration signals, produced during the performance of operational steps. Confirming that observed acoustic signals correspond to expected acoustic signatures, and/or that observed vibrational signals correspond to expected vibration signatures, associated with the operational steps confirms that the operational steps are being performed properly.

In accordance with an aspect of the present invention, a guide system adapted to provide confirmation of performance of an action by an individual includes a sensor operable to detect a non-visual sensory signal generated by the action of an individual, and a processor operable to analyze the detected non-visual sensory signal to determine if the detected non-visual sensory signal conforms to an expected non-visual sensory signal associated with the action. The processor is further operable to output a confirmation signal if the detected non-sensory signal conforms to the expected non-visual sensory signal. The non-visual sensory signal may comprise an audible signal and/or a vibrational signal. In particular embodiments the sensor may be configured as a microphone or a vibration sensor. The guide system may additionally include a directional light device that is selectively operable to project and target at least one indicating light to create visual indicators for the individual, as well as a guide system controller that provides control signals to the directional light device for projection of such visual indicators.

In accordance with a further aspect of the present invention, a method of assuring performance of actions by an individual includes detecting with a sensor a detected non-visual sensory signal generated by the action of an individual, determining if the detected non-visual sensory signal conforms to an expected non-visual sensory signal associated with the action by comparing with a processor the detected non-visual sensory signal to an expected non-visual sensory signal, and providing by the processor a confirmation signal if the detected non-visual sensory signal conforms with the expected non-visual sensory signal. In a further aspect of the invention, the method further includes providing a fault signal if the detected non-visual sensory signal does not conform with the expected non-visual sensory signal, or if a non-visual sensory signal is not detected.

The detected non-visual sensory signal may comprise a vibrational signal and/or an audible signal. In one embodiment, the detected non-visual sensory signal comprises an audible sound and the sensor comprises a microphone. In a particular embodiment, the detected non-visual sensory signal comprises an audible sound from the connection of one component to another component, such as the connection of two portions of a connector.

In a particular embodiment the method further includes projecting and targeting at least one indicating light with a directional light device to create visual indicators to guide additional actions of the individual. A guide system controller may be used to selectively provide control signals to the directional light device for projection of the visual indicators.

A monitoring and inspection system for a work area in an assembly line in accordance with an aspect of the present invention includes a first microphone and a processor. The first microphone is configured to sense sounds generated in a work area. The processor is configured to receive acoustic signals from the first microphone. The processor analyzes the received acoustic signals during the performance of an operational step performed in the work area. The processor is configured to identify a particular acoustic signature so as to verify that the identified acoustic signature is an acoustic signature associated with the operational step. The processor also confirms that the first operational step is correctly completed by confirming that the acoustic signature associated with the first operational step has been performed.

According to an aspect of the present invention, a method for determining an acoustic signature for a particular operational step performed in a work area includes monitoring, with a microphone, a work area. A plurality of iterations of a first operational step are performed in the work area and/or a particular process step. The method also includes producing, with the microphone, an acoustic signal during each iteration of the first operational step. Lastly, the method includes determining, with a processor, an acoustic signature associated with the first operational step based upon the acoustic signals produced during the iterations of the first operational step.

In an aspect of the present invention, the monitoring and inspection system includes a plurality of microphones that are arranged about a work area, such as around a periphery of the work area. Using the acoustic signals produced by the plurality of microphones, the processor is configured to determine a spatial location of the operational step with respect to the plurality of microphones, including confirming whether the acoustic signature of an operation matches both an expected acoustic signal and that the detected acoustic signal emanates from an expected location.

In a further aspect of the present invention, a first component and a second component installed in a work piece are configured such that coupling the first component to the work piece is associated with a first acoustic signature and coupling the second component to the work piece is associated with a second acoustic signature.

In an aspect of the present invention, the microphone is configured for attachment to an operator, such as to an operator's finger, hand, wrist, clothing, or to a headset or safety glasses worn by an operator.

These and other objects, advantages, purposes and features of the present invention will become apparent upon review of the following specification in conjunction with the drawings.

DESCRIPTION OF THE PREFERRED EMBODIMENTS

Figure 1A:
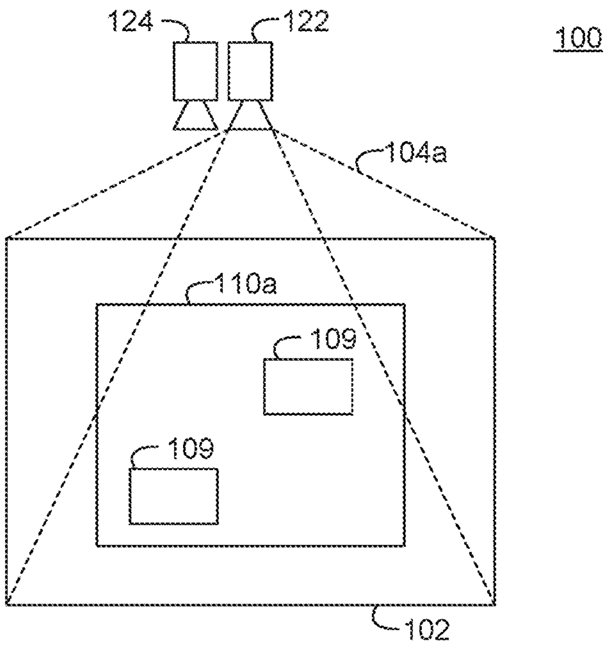
FIG. 1A is a perspective view of the positioning of a guide system and camera system with a work area, such as an assembly line, in accordance with the present invention.

The present invention will now be described with reference to the accompanying figures, wherein numbered elements in the following written description correspond to like-numbered elements in the figures. Methods and systems of the present invention provide for detection and recognition of non-visual sensory signals via sensors for monitoring of steps by an individual, such as operational steps performed in a manufacturing setting or the like, including the auditory and/or vibrational monitoring of operational steps, through the analysis of the auditory and/or vibrational signature associated with the performance of those operational steps. Such operational steps, and/or other steps for a given activity, may additionally be guided through the use of a light guided assembly system, such as the operational guide system disclosed in U.S. Pat. No. 7,515,981 (hereinafter the '981 patent), which is hereby incorporated by reference. In the present invention activities, with and without the guidance of a light guided assembly system, are monitored via auditory and/or vibrational monitoring. As discussed herein, an individual performing one or more steps of a given task is monitored by one or more microphones and/or transducers. This auditory and/or vibrational monitoring allows for the confirmation of operational steps, including operational steps that are incapable of or inconvenient for the use of conventional light guided assembly systems or monitoring via cameras. The detected auditory and/or vibrational signals that are detected by microphones and/or transducers positioned at or near the work area are compared to known, anticipated, or expected auditory and/or vibrational signatures, such as by way of predetermined expected signals. When auditory and/or vibrational signatures are identified in the monitored auditory and/or vibration signals, one or more operational steps associated with the monitored auditory and/or vibration signals may be "inspected." Such inspections may therefore confirm the proper performance of these operational steps even when the operational steps are in work areas that are incapable of being viewed by the light guided assembly systems.

An operational light guide system, such as disclosed in the '981 patent, is configured for the providing of visual indicators to an operator performing one or more actions, such as assembly actions on a work piece at a work station of an assembly line. Conventional light-guided systems are operable, in response to operation information or characteristic or identification information associated with a work piece, to selectively provide indicating lights to guide an operator in the selection and/or assembly of parts to a work piece. The light-guided system is also operable in response to confirmation signals which may be manually or automatically supplied to verify completion of a particular operation or task. The light-guided system is further operable to provide information to the operator such as, for example, a listing of steps needing completion, work instructions, images of a work piece, videos, and/or warnings regarding a missed or improperly performed assembly step.

As illustrated in FIG. 1 of the '981 patent, such light-guided systems may be incorporated into assembly line systems with the guide systems simultaneously moving along with the item or device being assembled or constructed on the assembly line. The light-guided system may also be configured for use with a stand-alone work station as opposed to a work station integrated into an assembly line. It should be appreciated that numerous alternative uses and/or configurations of light-guided systems exist.

As illustrated in FIG. 1A, while such conventional light-guided systems 100 are well suited for guiding, monitoring and/or confirming performance of particular activities, such as the selection of parts/pieces (such as those presented in bins or the like) for assembly into or integration into a work piece. There are, however, other assembly areas or activities where conventional light-guided systems and/or cameras are not as well suited. Some exemplary work pieces are three-dimensional and often include assembly steps that require an operator to insert, couple, fasten, or install a part to a location on or in the work piece that is not accessible to the indicator lights and camera systems of a conventional light-guided system. For example, the installation of one or more parts on or at an interior area of a work piece may be orientated such that the indicator lights and camera systems of the light-guided system are incapable of viewing and projecting on the point of interest of the work piece. A particular example is the assembly or installation of a dashboard of an automobile. In such an assembly, for example, an operator may need to reach into spaces or areas to connect electrical connectors of the dashboard with the remaining vehicle assembly, where the connectors are not readily exposed to a vision system. From an operator guidance standpoint, difficult applications or operations such as these would require other forms of guidance for the operator, such as on a wearable device, or simply relying on an operator memorizing each step without specific guidance.

Such a situation is illustrated in FIG. 1A, where at least one projector 122 is positioned above a work area or work station 102. The projector 122 has a field of view 104*a* that covers the work area 102. As illustrated in FIG. 1A, the field of view 104*a* completely covers the work piece 110*a* situated in the work area 102. Within this field of view 104*a* a plurality of images or geometric shapes 109 are projected onto the work area 102. As discussed in the '981 patent, the projected images 109 may then be used to direct the operational steps of an assembly process or other process utilizing the light-guided system 100. As discussed in the '981 patent, the projected images 109 may be used to identify locations for the insertion or attachment of parts 108 to the work piece 110*a*.

Figure 1B:
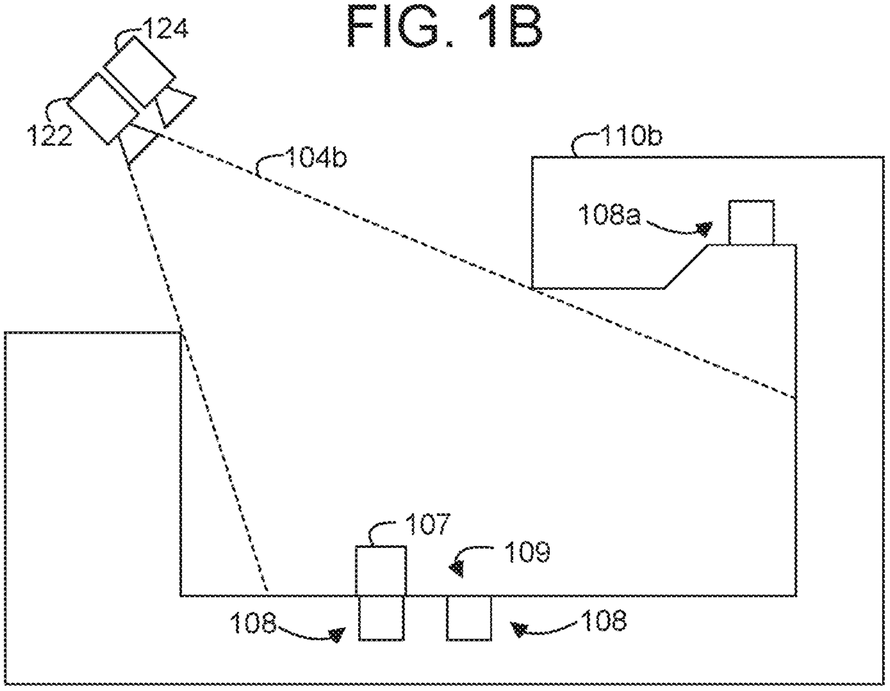
FIG. 1B is a perspective view of the positioning of a guide system and camera system with a particular work piece positioned on a work area, such as an assembly line, in accordance with the present invention.

However, with reference to FIG. 1B, when the work piece 110*b* has an irregular shape and/or includes a partially enclosed interior, the field of view 104*b* of the projector 122 may not completely cover the entire working surface of the work piece 110*b*. As illustrated in FIG. 1B, while the projector 122 is able to project a geometric shape 109 (identifying a location 108 for the insertion of a component or part 107) within a portion of the work piece 110*b*, there are portions of the interior of the work piece 110*b* that are blocked from the field of view 104*b*. For example, while the locations 108 in FIG. 1B are within the field of view 104 of the projector 122, location 108*a* is hidden from the field of view 104 of the projector 122 by a portion of the work piece 110*b*. Therefore, location 108*a* of the work piece 110*b* is unable to be included in any light-guided operational steps. Furthermore, location 108*a* of the work piece 110*b* is also unable to be included in any monitoring and quality control (via a camera 124 co-located with the projector) to oversee the progress of the operational steps.

Figure 2B:
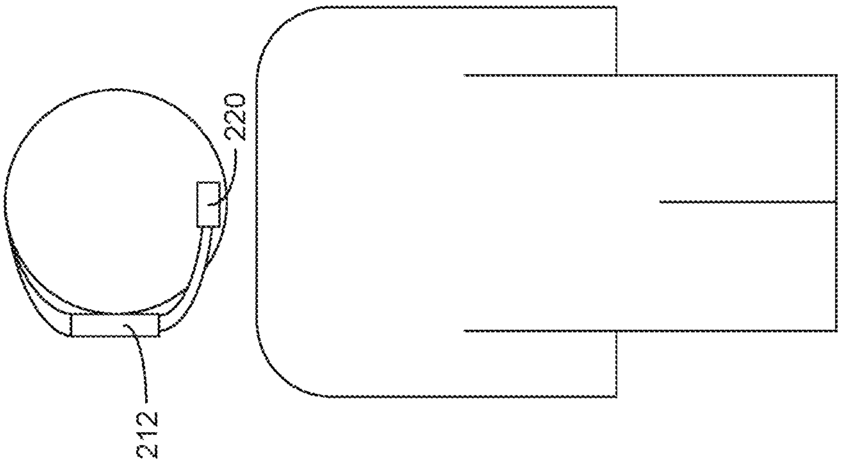
FIGS. 2A and 2B are perspective views of the placement of a microphone on an operator in accordance with an aspect of the present invention.
Figure 2A:
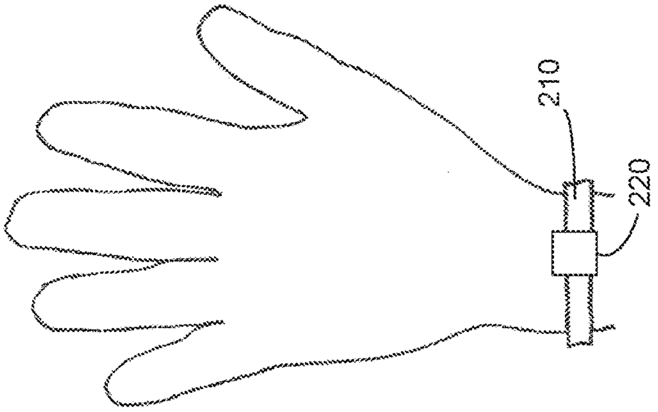
Figure 3:
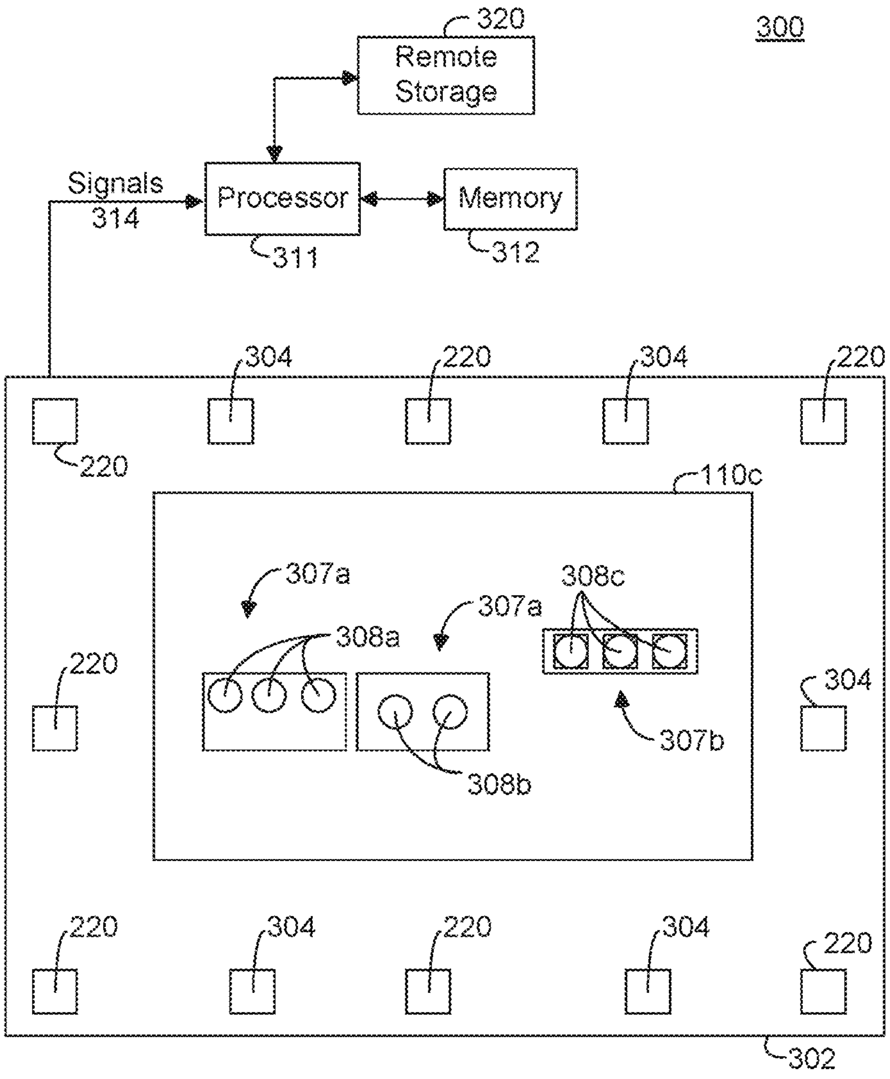
FIG. 3 is a perspective view of the positioning of microphones and pressure transducers on a work area of an assembly line for an acoustic and vibration inspection system in accordance with the present invention.

FIGS. 2A, 2B, and 3 illustrate an exemplary acoustic and/or vibration inspection system 300 that includes one or more microphones 220 and/or transducers 304. As illustrated in FIGS. 2A and 2B, a microphone 220 may be fitted to a bracelet 210 to be worn on the wrist, such that an operator may wear the bracelet and microphone (220, 212) when performing the operational steps discussed herein. Alternatively, the microphone 220 may be fitted to a glove, glasses or other head gear (e.g., a headset 210, such as used with artificial reality (AR) headsets). Other articles, such as a lapel clip or other similar clothing fixtures, may also be used to wear the microphone 220. In the case of the assembly of electrical connectors, for example, the microphone 220 may be used to monitor for assembly sounds of connectors being connected. For example, an operator wearing microphone 220 on their hand may be required to connect certain connectors together as part of an assembly, such as assembly related to dashboard installation. The microphone 220 will thus record sounds emanating from the actions by the operator, such as the "click" or other identifiable sounds generated by assembly operations. The identifiable sounds comprise sounds that are sufficiently repeatable whereby they can be recognized via a control system detecting the sounds, such as by an acoustical detection algorithm running on a controller. Optionally, the microphone 220 may be configured as a stationary, unidirectional microphone, or configured as a microphone array designed for noise rejection.

When performing a particular operational step (e.g., assembling a component, inserting a screw or bolt into a work piece, coupling a wire or cable to the work piece via a coupler/connector, or other similar activity that installs a component or part 308 to the work piece), the microphone 220 is configured to detect or pick-up the acoustic results of that action (e.g., the resulting "click" when a cable's connector is coupled to a corresponding connector on the work piece). This acoustic result that is picked-up by the microphone 220, is communicated as an audio or acoustic signal 314 to a processor 311. This acoustic signal 314 is then compared by the processor 311 to a series of expected acoustic signatures, such as established via previous recordings of known operational steps (e.g., the acoustic result of coupling a particular cable connector to a terminal on the work piece 110*c*, and inserting a screw or bolt into the work piece 110*c*). The processor 311 may be constructed as a desktop or laptop style PC, a PLC or the like, or may be a networked computer system that may be used to monitor other aspects of the assembly line and work stations, or a mobile device or tablet. In an aspect of the present invention, the computer system is configured for receiving and processing inputs from the camera 124 and the microphone(s) 220, as well as configured for generating and outputting signals to the projector 122. Optionally, the computer system may be equipped with a means for connecting to the Internet.

The acoustic signal 314 from the microphone 220 typically enters the computer system via a microphone jack, or other similar means. In an aspect of the present invention, a web browser running a JavaScript-enabled page may be used that collects the audio samples and uploads them to a cloud server (via an Internet connection). The cloud server runs algorithms on the audio samples and sends messages back to the computer system with a "presence/absence" judgement and a probability score of whether a "click" or other audio signature was heard. This message is received by, for example, a light guide assembly system, and used to create user feedback on whether the "click" was heard. Optionally, the data flow can work without the use of a light guide assembly system, for example, if the goal is to have a historical record of when a non-visual sensory signal or signature is detected, such as when audible "clicks" were heard or a vibration is detected. This data can be processed at a later time, for example, once a vehicle is in a final inspection and rework before it leaves the plant.

With the use of a single microphone 220 (such as fitted to a wristband 210 or headset 212), the acoustic results of the performance of the operational steps may be monitored such that an acoustic monitoring or inspection (as performed by the processor 311) is able to take place. Alternatively, a series or array of microphones 220 may be arranged around a work area or work station 302 such that a work piece 110*c* may be placed within the work area 302 to be monitored by the array of microphones 220. With the array of microphones 220, the processor is configured to monitor the acoustic results of the performance of the operational steps such that the processor 220 may perform acoustic monitoring or inspection during the performance of one or more operational steps. With the array of microphones 220, the processor 311 is configured to determine which type of cable connection, part assembly, or activity has been coupled to or performed on the work piece 110*c* by identifying the matching acoustic signature for the performed operational step. Furthermore, using the array of microphones 220, the processor 311 is also configured to perform a triangulation of the location of the operational step. This allows for the determination and inspection of not only the type of operational step taking place but also its location within or upon the work piece 110*c*. For example, there are an exemplary five locations (three at location 308*a* and two at location 308*b*) for installing a component 307*a*, as well as three locations 308*c* for installing component 307*b*. While each of the installations of component 307*a* would have a same resulting acoustic signature, its location with respect to the layout of the work piece 110*c* would be different. This resulting acoustic signature and associated spatial location allows the processor 311 to perform an acoustic inspection of each of the operational steps on the work piece 110*c*.

In addition to the microphones 220 placed around the periphery of the work area 302, one or more pressure transducers 304 may also be placed around the periphery of the work area 302. The series of pressure transducers 304 are configured to detect and communicate a signal to the processor 311 that is a representation of the physical effects (vibrations) resulting from the performance of the operational steps as they are carried out on the work piece 110*c*. It should be appreciated that pressure transducers 304 may alternatively be used without microphones to monitor operational steps. For example, the integration of one or more transducers 304 for detecting vibrations at a work area, such as in the table top of an assembly bench, may be used to detect vibrations associated with and generated by the assembly or connection of various components, with a processor discerning based on the vibrational signals whether the correct components are assembled, including in a proper sequence. The system may also be configured to generate alerts upon detection of an unexpected vibration. For example, if during an assembly operation a part is mishandled such that it potentially has been damaged, an alert may be generated. Including an alert requiring inspection by another individual, such as a supervisor or the like.

In an aspect of the present invention, the microphones 220 are conventional microphones. The processor 311 is configured to utilize machine learning or other similar processing techniques to associate a sound or acoustic result of a particular operational step (e.g., the resulting "click" when a cable connector is coupled to a corresponding connector on the work piece) with an acoustic signature to be stored in memory 312. The resulting acoustic signature for a particular operational step may be formed through a process whereby the same operational step is carried out again and again. The repetition of the operational step is accompanied by a recording of the acoustic results of each iteration of the operational step. The resulting acoustic signature of the operational step is a best representation of the acoustic result of the operational step. The memory 312 may therefore store a corresponding acoustic signature for each operational step to be carried out. Such a formation of an acoustical signature may be formed through the use of traditional signal processing or machine learning.

In a further aspect of the present invention, a remote storage or network server 320 may be configured to store a large variety of already acquired acoustic signatures for possible operational steps. For a particular manufacturing process, the processor 311 may be configured to request from the remote storage 310 the needed acoustic signatures for each of the required operational steps to be performed in the particular manufacturing process. Thus, the processor 311 is able to utilize locally stored acoustic signatures (stored in the memory 312) when the processor 311 performs an algorithm and compares the resulting acoustic signal to the stored acoustic signatures.

In an aspect of the present invention, acoustical or vibrational monitoring algorithms may be developed remotely, such as either via machine learning or neural network analysis, including through application of artificial intelligence, or may be developed via traditional signal processing. In a particular embodiment, a series or multiple correctly performed steps may be recorded, with the results transmitted to a remote computer, such as via an Internet or cloud based system. The remote computer may then perform an analysis to generate the acoustical or vibrational monitoring algorithms that are transmitted for use at a local computer with the operational step that is to be monitored. Alternatively, recorded sounds for each operation may be transmitted and analyzed at a remote computer for confirmation of operations and/or acoustical or vibrational monitoring algorithms may be generated at a local computer. In particular embodiments, the generation of acoustical or vibrational monitoring algorithms will additionally involve dealing with background noise. For example, it should be appreciated that in numerous workplace settings, such as manufacturing, assembly or other industrial settings, numerous other sources of noise and vibrations may be present in addition to the noise or vibrations associated with the desired operational characteristic to be monitored, including noise and vibrations that may be changing over time and/or have random acoustical or vibrational characteristics. Such background noise may be generated by other machines, tools, operations and the like. Accordingly, machine learning may be employed, including potentially additionally through application of artificial intelligence techniques, to learn, acquire and/or distinguish the correct or desired acoustical or vibrational signal, such as the click of a connector, over the background noise/vibrations to effectively filter out the non-relevant noise. For example, a series of a series or multiple correctly performed steps may be recorded over various times with various background noises occurring and provided for analysis to generate the acoustical or vibrational monitoring algorithms, with the employed machine learning compensating for and/or filtering out the background noise.

In a further aspect of the present invention, an exemplary algorithm learning process may begin with a machine learning algorithm that would require, for example, thousands of samples of "clicks", and an extended time duration of monitoring background noise data, such as over a twenty-four hour period. Alternatively, spectrograms may be made which plot sound intensity (represented as a dark/light gray color) as a function of time (x-axis) and frequency ranges (y-axis). Such an algorithm may be configured to detect a high intensity "click" and will not be frequency selective. In an alternative embodiment, the algorithm limits the processing, detection, recording and/or comparison to a range of frequencies selective to the expected signals, such as an expected "click", and may also apply an edge filter to focus detection on particular short impulses.

In accordance with the present invention, non-sensory signals generated by the actions of an individual performing a particular operation or task, such as an assembly, inspection, kitting task, or the like, are detected via one or more sensors, with a processor being used to analyze the signals, or lack thereof, to determine if the action is performed correctly. Rather than just detecting the "click" of electrical connections, embodiments of the present invention may be used for detecting actions involving hose clamps, air-powered tools, such as those used to install "hog rings" in automotive seats, clipping plastic or metal clips onto plastic parts, such as automotive door panels, snapping electrical terminals together, shutting doors, tossing parts into a cardboard box, opening a box, setting a tool down on a tabletop, grinding steel prior to a weld, and people knocking or tapping a surface to exercise an input to a computer (e.g., tap on a part when ready to move onto the next step). That is, sensors may be employed to detect various non-visual sensory signals. Such non-visual sensory signals include various types and forms of auditory signals including different sounding clicks and/or auditory signals other than clicks, such as by way of microphones or other auditory sensors. The non-visual sensory signals further include various types and forms of vibrational signals, which may be detected by vibration sensors, such as accelerometers, pressure transducers as well as other piezoelectric devices or vibrational detecting sensors.

Figure 5:
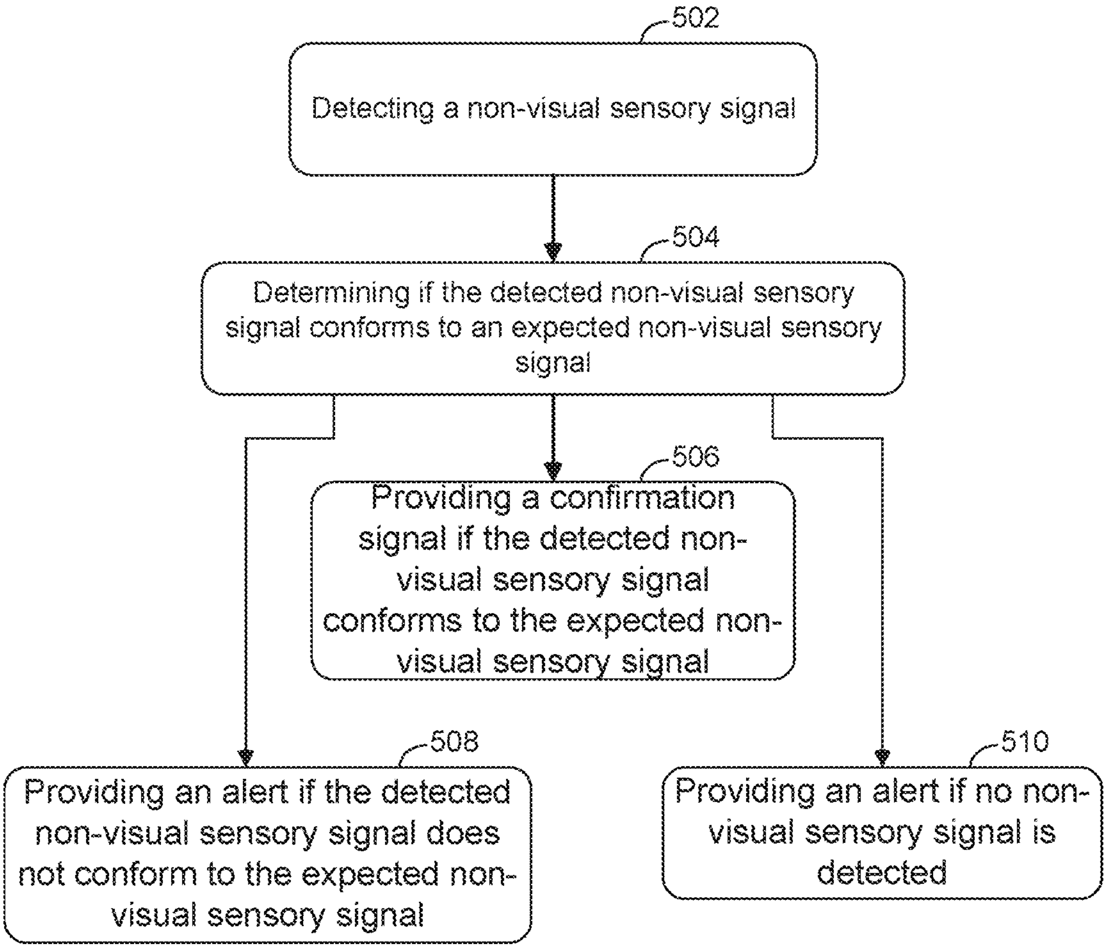
FIG. 5 is a flow diagram of the steps for confirming that the detected non-visual sensory signal generated by an action conforms to the expected non-visual sensory signal associated with the action in accordance with the present invention.

FIG. 5 illustrates the steps to a flow chart for confirming that a detected non-visual sensory signal generated by an action (whether performed by an individual or a mechanical step) conforms to an expected non-visual sensory signal associated with the action. In step 502 of FIG. 5, a non-visual sensory signal is detected that is generated by an action. In step 504 of FIG. 5, it is determined whether the detected non-visual sensory signal conforms to an expected non-visual sensory signal associated with the action by comparing with the processor 311 the detected non-visual sensory signal to an expected non-visual sensory signal. In step 506 of FIG. 5, a confirmation signal is provided if the detected non-visual sensory signal conforms to the expected non-visual sensory signal. In step 508 of FIG. 5, an alert signal is provided if the detected non-visual sensory signal does not conform to the expected non-visual sensory signal. In step 510 of FIG. 5, an alternative alert signal is provided if no non-visual sensory signal is detected in step 502

As illustrated in FIG. 3, the installation of a first component (307*a*) will have a different acoustic signature than the installation of a second component (307*b*). In an aspect of the present invention, the first and second components 307*a*, 307*b* are configured to produce different acoustic results. For example, while both of the components (307*a*, 307*b*) may be cable connectors, they are configured differently such that a particular series of clicks or associated sounds produced by coupling the cable connectors to connectors on the work piece 110*c* will be different depending on which component is coupled to the work piece 110*c*. Alternatively, the acoustic signature differences between the two different components (307*a*, 307*b*) may be due to different resulting sound frequencies produced by coupling the connectors. Other acoustic signals or differences may also be utilized to produce differentiable acoustic signatures that may be used for monitoring activities. For example, the acoustic signature may be a combination of different acoustic signals, such as the sound of a torque wrench running and ending with a "click" when the bolt has been torqued to a required torque level, the sound of pneumatic valves operating. In other words, the components may be configured such that two different components will have readily differentiable acoustic signatures. In the case of electrical connectors, for example, connectors in an assembly may be selected or designed to generate different acoustical signals, such as based on the number of clicks, the sound of the clicks such as by way of the pitch or frequency of the clicks. That is, a given assembly operation may require the connection of multiple connectors, with each of the connectors configured or designed to produce different acoustical signals that are monitored by the system. Alternatively or additionally, a series of assembly operations may be monitored by counting or tracking the number of expected "clicks" or connections for a given operation—e.g. if an assembly has five connectors the system will raise an alert if it does not detect five acoustical signals for such connectors. Still further and/or additionally, confirmation may also originate from combining the correct sound with the detection that the operator's hands are in the correct location at the correct time, such as by using a three-dimensional sensor for spatial detection of the operator's hands and/or body.

As noted, in accordance with an aspect of the present invention, connectors, such as electrical connectors or other connectors used in engineering settings, may be designed to generate or annunciate a unique and identifiable, robust acoustical or vibrational signal. This may be based on, for example, the size, shape and/or materials used for the connector, such as for each of a first and second connecting halves or parts, as well as other design aspects for the connector.

In a further aspect of the present invention, the microphones 220 are also configured to pick up the speech of the operator. By monitoring the speech of the operator, a narrative may be combined with the monitored acoustic results of the operational steps as they are performed. For example, commentary, such as "bolt one" may be combined with a resulting acoustic signal for verification/inspection of the operational step to ensure that the operational step was properly carried out (i.e., the proper cable connector was coupled to the proper connector on the work piece 110*c*). The commentary recorded during the operational step may be used to provide a narrative of the operational step.

In an aspect of the present invention, the acoustic inspection system may be utilized in a conventional manufacturing or processing environment as a monitoring system. For example, the acoustic environment of the manufacturing/processing area can be monitored for signs of an acoustic signature of a particular event (e.g., the completion of a work piece and the placing of the completed work piece in a storage bin, the initial placement of a work piece upon a work surface, and a malfunction or unexpected sound, such as from parts being mishandled and falling or the like).

As discussed herein, the acoustic and vibration inspection system may be coupled with conventional light-guided systems. For example, a part present at a particular work station may be determined by the camera 122 by detecting the geometrically distinguishing features of a work piece or the structure upon which it is located to "identify" the work piece or the component to be attached to the work piece. In other words, where the light-guided system guides the operator through the majority of the operational steps, the acoustic and vibration inspection system may be used to monitor the performance of those operational steps that are unable to be performed with the use of the light-guided system. As also discussed herein, whether or not the light-guided system is used for guiding the performance of the operational steps, the acoustic and vibration inspection system may be used to inspect the individual operational steps as an additional verification of the proper performance of the operational steps.

Figure 4:
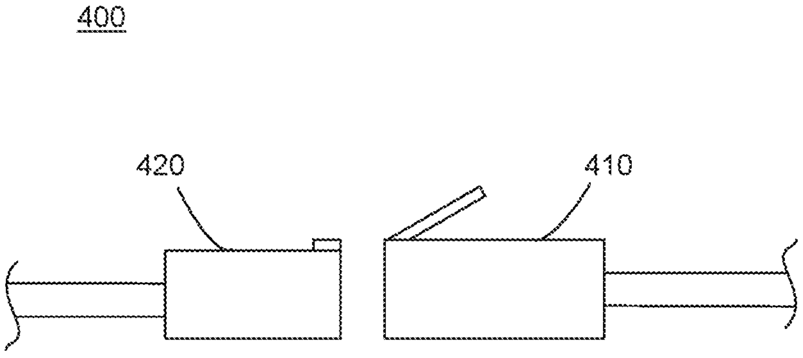
FIG. 4 is a side elevation view of a pair of connectors or connector portions positioned for coupling in accordance with the present invention.

In a still further aspect of the present invention, acoustic or vibration energy may be applied to a component, such as a part or an assembly, with a sensor, such as a microphone or vibration transducer, configured to detect the responsive acoustical or vibrational signal generated in the component by the applied energy. The responsive acoustical or vibrational signal generated in the component may then be analyzed in like manner to the discussion above to determine aspects of the component, including for example, whether the component is properly configured or assembled. The application of acoustic or vibration energy may be applied, for example, via a transducer. In an exemplary embodiment, illustrated in FIG. 4, a connector 400 comprising first (410) and second (420) connecting parts may be connected via a robot, with the robot configured to apply acoustic or vibration energy to the connector 400 and detect via a sensor the responsive acoustical or vibrational signal generated in the components (410,420) to confirm the connector 400 has been properly connected. In another exemplary embodiment, a device may be used to strike a component, such as an assembly to apply the acoustic or vibration energy. For example, an actuator may be used to strike a transmission housing, where none or more microphones disposed about the housing may then detect the responsive acoustical or vibrational signal generated in the housing to confirm that the transmission is properly assembled. Machine learning may also be employed to generate an appropriate algorithm for confirming proper assembly, as well as providing a signal as to potential defects based on learned known outcomes of improper assemblies.

Although not illustrated, an assembly guide system may also incorporate known ultrasonic, electromagnetic, and/or similar technology used to confirm, for example, that a tool is placed onto the proper bolt or nut at an assembly operation. Such technology is configured to send and receive ultrasonic frequencies with the spatial location of a sent or received signal being monitored to confirm that an operation is performed at a proper location. Thus, an assembly guide system may be configured to utilize both light sources and ultrasonic, electromagnetic, and or similar technology to confirm assembly or other manual process steps.

The processor 311 may also be used to monitor and record various parameters useful for improving productivity. For example, the processor 311 may record cycle times of the individual operational steps at a work station 302 and/or the combined cycle time of operations at a work station 302. Correspondingly, the processor 311, or another such computational device, may record and provide charts or reports regarding recorded error data, such as on mis-performing steps, and/or cycle times. In addition, such data may be linked or otherwise networked, or even monitored via the internet, such that the variously above noted cycle times or performance parameters may be monitored from a remote computer, with such data being viewable in a live format or archived.

The acoustic and vibration inspection or monitoring system 300 may also be configured for use with a stand-alone work station as opposed to a work station integrated into an assembly line. Still further, the system of the present invention may be used to monitor the proper performance of numerous activities. For example, an inspection operation may require an operator to brush his or her hand or an inspection tool over a given location, such as on a part or an assembly. A microphone positioned at the assembly or worn by an operator may be used to detect the sound generated by the brushing action, such as to confirm that the step was performed and/or to evaluate the generated sound for any unusual signals that would indicate a problem. The system may also be used to detect the acoustical or vibrational signal generated by movement of a component, such as in an assembly. This may include, for example, movement of a seat in tracks or movement of a headrest. Aspects of the system may be employed in an autonomous vehicle, such as to for listening to road noise to confirm proper operation of the vehicle. This may include listening for rumble of tires on unexpected surface, such as grooves in side of road or rumble strips. The system may also be used for inspection or diagnostics of equipment, such as machines such as vehicles. For example, recordings of properly operating vehicle engines, washing machines or dryers may be made to generate a database and/or algorithm for the acoustical signal associated with proper operation. Diagnoses of a machine may be made, for example, by an individual holding a phone adjacent the machine with the sound being transmitted remotely for comparison with the acoustical signal to determine if the machine is operating properly. Likewise, one or more algorithms may be configured to diagnose particular known problems, such as associated with a bearing problem, pulley problem, spark plug problem, or other noise.

The acoustic and vibration inspection system of the present invention is thus readily programmable with acoustic signatures of expected operational steps, such that when an operator is performing the operational steps, an acoustic signal resulting from the performance of the operational step may be analyzed to confirm that a particular activity has resulted in a proper component being installed into or on the work piece in the proper location. Therefore, the acoustic and vibration inspection system provides a cost effective and accurate method of monitoring an individual through a series of tasks and/or provide confirmation that the tasks have been properly completed. Aspects of the invention may be employed and/or used with U.S. Pat. Nos. 9,658,614, 9,965,897, both of which are hereby incorporated herein by reference. For example, a microphone for use in accordance with the present invention may be mounted on or integrated with a head wearable display device as disclosed in U.S. Pat. No. 9,965,897, including with a wearable microphone that an operator may wear elsewhere that communicates either by wire or wirelessly with the head wearable display device. Likewise, the system of the present invention may be employed and/or used with a light guided system as disclosed in U.S. Pat. No. 9,658,614.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A guidance, monitoring, and inspection system for a work area comprises:

an operational guide system comprising a light projector, wherein the operational guide system is configured to direct the light projector to selectively provide visual indicators to guide actions of the individual in a work area;

a sensor configured to sense sounds and/or vibrations generated in the work area during the performance of an operational step performed in the work area;

a processor configured to receive signals from the sensor, wherein the signals comprise acoustic and/or vibrational signals;

wherein the processor is configured to analyze the received signals that are received during the performance of the operational step performed in the work area;

wherein the processor is configured to verify that the received signals match an identified signal signature associated with the operational step;

wherein the processor is further configured to confirm that the operational step is correctly completed by confirming that the received signals match the signal signature associated with the operational step; and wherein the operational guide system is configured to indicate to the individual another operational step after the processor has confirmed completion of the operational step, and wherein the operational guide system is operable to hold indication of the another operational step until the processor has confirmed completion of the operational step.

2. The system of claim 1, wherein the sensor comprises a transducer.

3. The system of claim 1, wherein the operational guide system further comprises a camera configured to image actions of the individual in the work area, and wherein the processor is configured to analyze images of the actions of the individual in the work area to confirm completion of an action by the individual, and wherein the operational guide system is configured to indicate to the individual another operational step after the processor has confirmed both completion of the operational step and completion of the action by the individual.

4. The system of claim 1, wherein the operational step comprises a plurality of steps with each step associated with a particular portion of the associated signal signature, and wherein the particular portions of the associated signal signature are arranged in a particular order.

5. The system of claim 1, wherein the processor is configured to determine an associated time period within a time range for when a particular operational step is being performed during the task, wherein each particular portion of the associated signal signature is associated with a respective portion of the associated time period for when the particular operational step is being performed during the task.

6. The system of claim 1, wherein the operational guide system further comprises a camera configured to image the work area, and wherein the processor is configured to analyze images of the work area to confirm completion of an action by the individual, and wherein the operational guide system is configured to indicate to the individual another operational step after the processor has confirmed both completion of the operational step and completion of the action by the individual.

7. A guidance, monitoring, and inspection system for a work area comprises:

an operational guide system comprising a light projector, wherein the operational guide system is configured to direct the light projector to selectively provide visual indicators to guide actions of an individual in a work area;

a first vibration sensor configured to sense vibration signals;

a processor configured to receive the vibration signals from the first vibration sensor;

wherein the processor is configured to analyze and compare the received vibration signals to a vibration signature associated with an operational step, wherein the received vibration signals are received during the performance of the operational step performed in the work area;

wherein the processor is further configured to confirm that the operational step is correctly completed by confirming that the received vibration signal matches the vibration signature associated with the operational step; and wherein the operational guide system is configured to indicate to the individual another operational step after the processor has confirmed completion of the operational step, and wherein the operational guide system is operable to hold indication of the another operational step until the processor has confirmed completion of the operational step.

8. The guidance, monitoring, and inspection system of claim 7, wherein the operational step comprises a plurality of steps with a plurality of associated vibration signatures, and wherein the vibration signatures of the plurality of associated vibration signatures are arranged in a particular order.

9. The guidance, monitoring, and inspection system of claim 7, wherein the processor is configured to differentiate between two vibration signals based upon at least one of: frequencies of the vibrations signals, identification of particular vibrations associated with a coupling of a component to the work piece, and a quantity of the identified vibrations.

10. The guidance, monitoring, and inspection system of claim 7 further comprising a plurality of vibration sensors arranged around a periphery of the work area, wherein the vibration sensors are each configured to sense vibration signals, and wherein the processor is configured to determine a spatial location of the received vibration signals from the plurality of vibration sensors, wherein the spatial location is with respect to the location of each of the plurality of vibration sensors.

11. The guidance, monitoring, and inspection system of claim 7, wherein the processor is configured to determine an associated time period within a time range for when a particular operational step is being performed during the task.

12. The guidance, monitoring, and inspection system of claim 7 further comprising a network server configured to store a plurality of vibration signatures, each vibration signature corresponding to at least one particular operational step, wherein each operational step is associated with at least one corresponding vibration signature, and wherein the processor is configured to request all vibration signatures associated with a particular operational step from the network server for local storage.

13. The guidance, monitoring, and inspection system of claim 7, wherein the operational step includes the installation of a first component and a second component, wherein installing the first component produces an vibration signal that is different from the vibration signal produced by installing the second component, and wherein the first component is configured to produce a first vibration signal that matches a first vibration signature and the second component is configured to produce a second vibration signal that matches a second vibration signature, and wherein the associated vibration signature comprises the first vibration signature and the second vibration signature.

14. A guidance, monitoring, and inspection system for a work area comprises:

an operational guide system comprising a light projector, wherein the operational guide system is configured to direct the light projector to selectively provide visual indicators to guide actions of an individual in a work area;

one or more sensors configured to sense sounds and/or vibrations, respectively, generated in the work area;

a processor configured to receive acoustic signals and/or vibration signals from the one or more sensors;

wherein the processor is configured to analyze and compare the received acoustic signals and/or vibration signals to an acoustic signature and/or vibration signature, respectively, associated with an operational step, wherein the received acoustic signals and/or vibrational signals are received during the performance of the operational step performed in the work area;

wherein the processor is configured to perform the analysis and comparison of the received acoustic signals and/or vibration signals when the operational guide system indicates that the operational step is being carried out;

wherein the operational guide system is configured to determine that the operational step is being carried out as defined by first inputs comprising one or more of: operator input of the individual, received sensor data, and received video data;

wherein the processor is further configured to confirm that the operational step is correctly completed by at least one of: (1) confirming that the received acoustic signal and/or vibration signal matches the acoustic signature and/or vibration signature, respectively, associated with the operational step, and (2) receiving a confirmation indication from the operational guide system that the operational step has been completed, wherein the operational guide system is configured to confirm the operational step is correctly completed as defined by subsequent inputs comprising one or more of: additional operator inputs of the individual, additional sensor inputs, and additional video inputs; and wherein the operational guide system is configured to indicate to the individual another operational step after the processor has confirmed completion of the operational step, and wherein the operational guide system is operable to hold indication of the another operational step until the processor has confirmed completion of the operational step.

15. The guidance, monitoring, and inspection system of claim 14, wherein the sensor is a transducer.

16. The guidance, monitoring, and inspection system of claim 14, wherein the processor is further configured to identify the acoustic signature and/or vibration signature associated with the operational step by identifying a particular acoustic signature and/or vibration signature from a plurality of acoustic signatures and/or vibration signatures, respectively, that most closely matches the received acoustic signals and/or vibration signals, and verifying that the identified acoustic signature and/or vibration signature is an acoustic signature and/or vibration signature associated with the operational step.

17. The guidance, monitoring, and inspection system of claim 14, wherein the operational input of the individual comprises selected operator feedback indicating the operational step is taking place, and wherein the additional operator inputs of the individual comprise subsequent operator feedback indicating the operational step has been completed.

18. The guidance, monitoring, and inspection system of claim 14, wherein the received sensor data comprises data associated with a work piece and/or components present in the work area that are associated with the operational step, and wherein the video data comprises spatial data corresponding to expected positioning and orientation of the work piece present in the work area with respect to the operational step.

19. The guidance, monitoring, and inspection system of claim 18, wherein the received sensor data comprises characteristic data and/or identification information associated with the work piece and/or components present in the work area.

20. The guidance, monitoring, and inspection system of claim 19, wherein the additional sensor inputs comprise additional data associated with the work piece and/or components present in the work area and comprising additional characteristic data associated with the work piece and/or components present in the work area and indicating that the operational step has been correctly completed, and wherein the additional video data inputs comprise spatial data corresponding to expected positioning and orientation of the work piece present in the work area with respect to the operational step and indicating that the operational step has been correctly completed.

* * * * *